United States Patent
Funaki et al.

(10) Patent No.: US 7,812,086 B2
(45) Date of Patent: Oct. 12, 2010

(54) FLUORINATED ELASTOMER LATEX, ITS PRODUCTION METHOD, FLUORINATED ELASTOMER AND FLUORORUBBER MOLDED PRODUCT

(75) Inventors: Hiroshi Funaki, Ichihara (JP); Ryuji Seki, Yokohama (JP); Kazuya Oharu, Chiyoda-ku (JP); Hiroki Kamiya, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 476 days.

(21) Appl. No.: 11/291,812

(22) Filed: Dec. 2, 2005

(65) Prior Publication Data

US 2006/0199898 A1 Sep. 7, 2006

(30) Foreign Application Priority Data

Mar. 4, 2005 (JP) .............................. 2005-061233
Oct. 4, 2005 (JP) .............................. 2005-291572

(51) Int. Cl.
*C08L 27/12* (2006.01)

(52) U.S. Cl. ...................... 524/544; 526/242; 526/247; 526/250

(58) Field of Classification Search ................. 524/544; 526/242, 247, 250
See application file for complete search history.

(56) References Cited

U.S. PATENT DOCUMENTS

| | | | | |
|---|---|---|---|---|
| 3,271,341 A | * | 9/1966 | Garrison, Jr. ................. | 524/777 |
| 5,585,449 A | * | 12/1996 | Arcella et al. ................ | 526/247 |
| 6,512,063 B2 | * | 1/2003 | Tang ........................... | 526/225 |
| 6,710,132 B2 | * | 3/2004 | Apostolo et al. ............. | 525/199 |
| 6,794,550 B2 | * | 9/2004 | Hintzer et al. ............... | 570/178 |
| 6,825,250 B2 | * | 11/2004 | Epsch et al. ................. | 523/310 |
| 6,861,466 B2 | * | 3/2005 | Dadalas et al. ............... | 524/544 |
| 2005/0107506 A1 | * | 5/2005 | Kapeliouchko et al. ...... | 524/379 |
| 2006/0047084 A1 | * | 3/2006 | Funaki et al. ............... | 525/326.2 |
| 2007/0015864 A1 | | 1/2007 | Hintzer et al. | |
| 2007/0025902 A1 | | 2/2007 | Hintzer et al. | |
| 2007/0027251 A1 | | 2/2007 | Hintzer et al. | |
| 2008/0015304 A1 | | 1/2008 | Hintzer et al. | |
| 2008/0114122 A1 | | 5/2008 | Brothers et al. | |

FOREIGN PATENT DOCUMENTS

| | | |
|---|---|---|
| EP | 1 335 007 A1 | 8/2003 |
| EP | 1335007 A1 * | 8/2003 |
| JP | 61-223007 | 10/1986 |
| JP | 2002-317003 * | 10/2002 |
| JP | 2003-119204 * | 4/2003 |
| RU | 2 136 702 C1 | 12/1994 |
| RU | 2 189 992 C2 | 6/1999 |
| WO | WO 2006/011533 A1 | 2/2006 |

OTHER PUBLICATIONS

Patent Abstracts of Japan, JP 2002-317003, Oct. 31, 2002.
Patent Abstracts of Japan, JP 2005-036002, Feb. 10, 2005.
U.S. Appl. No. 12/391,725, filed Feb. 24, 2009, Takagi, et al.

* cited by examiner

*Primary Examiner*—Peter D. Mulcahy
*Assistant Examiner*—Henry Hu
(74) *Attorney, Agent, or Firm*—Oblon, Spivak, McClelland, Maier & Neustadt, L.L.P.

(57) ABSTRACT

The current invention relates to a fluorinated elastomer latex containing an aqueous medium, a fluorinated elastomer dispersed in the aqueous medium in an amount of from 10 to 60 mass % and a fluorinated emulsifier represented by the formula (1): $C_2F_5O(CF_2CF_2O)_m CF_2COOA$ (wherein A is a hydrogen atom, an alkali metal or $NH_4$, and m is an integer of from 1 to 3), which employs no perfluorooctanoate emulsifier and which is excellent in dispersion stability of the fluorinated elastomer.

10 Claims, No Drawings

FLUORINATED ELASTOMER LATEX, ITS PRODUCTION METHOD, FLUORINATED ELASTOMER AND FLUORORUBBER MOLDED PRODUCT

The present invention relates to a fluorinated elastomer latex stabilized by a specific fluorinated emulsifier, its production method, a fluorinated elastomer to be obtained from the fluorinated elastomer latex and a fluororubber molded product.

Heretofore, methods of homopolymerizing a fluoromonomer or copolymerizing a fluoromonomer with another monomer in an aqueous medium employing various emulsifiers have been widely used, and various emulsifiers have been proposed, as disclosed in U.S. Pat. No. 3,271,341, JP-A-2002-317003, etc.

Methods for producing fluoropolymers (resins) employing emulsifiers as disclosed in these documents have been known, but a method for producing a so-called fluorinated elastomer wherein a polymer has a glass transition point of at most room temperature, particularly at most 10° C., has not been known yet.

Further, a perfluoroemulsifier to be commonly used for emulsion polymerization for a fluoropolymer is attached to a fluoropolymer to be obtained after coagulation of a fluoropolymer latex in a large amount, and a method to reduce the addition amount has been desired.

Further, a perfluorooctanoate emulsifier to be commonly used for emulsion polymerization for a fluoropolymer is considered to affect the environment, and it has also been desired to employ an emulsifier having a different structure.

Under these circumstances, it is an object of the present invention to provide a fluorinated elastomer latex excellent in dispersion stability of a fluorinated elastomer, by means of emulsion polymerization employing a specific fluorinated elastomer having a structure different from that of a perfluorooctanoate emulsifier to be commonly used for emulsion polymerization for a fluoropolymer, to reduce the content of the emulsifier attached to a fluorinated elastomer obtained by coagulation of the fluorinated elastomer latex, and to provide a fluororubber molded product excellent in physical properties by crosslinking the fluorinated elastomer.

Namely, the present invention provides a fluorinated elastomer latex containing a fluorinated emulsifier represented by the formula (1):

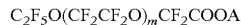

$C_2F_5O(CF_2CF_2O)_mCF_2COOA$ wherein A is a hydrogen atom, an alkali metal or $NH_4$, and m is an integer of from 1 to 3.

The present invention further provides the above fluorinated elastomer latex, wherein the fluorinated elastomer is a polymer of at least one fluoromonomer selected from the group consisting of tetrafluoroethylene (hereinafter referred to as TFE), vinylidene fluoride (hereinafter referred to as VdF), hexafluoropropylene (hereinafter referred to as HFP), a perfluoro(alkyl or alkyloxyalkyl vinyl ether) represented by $CF_2=C(OR^f)_nF_{2-n}$ (wherein $R^f$ is a $C_{1-9}$ perfluoroalkyl group or perfluoro(alkyloxyalkyl) group containing one or more ether bonds, n is 1 or 2, and each carbon chain may be linear or contain branches, or may have a cyclic structure) (hereinafter referred to as PAVE) and chlorotrifluoroethylene (hereinafter referred to as CTFE), as the case requires, at least one hydrocarbon monomer selected from the group consisting of a vinyl ether represented by $CH_2=CHOR$ (wherein R is a $C_{1-8}$ alkyl group or alkyloxyalkyl group containing one or more ether bonds, and each carbon chain may be linear or contain branches, or may have a cyclic structure), propylene (hereinafter referred to as P) and ethylene (hereinafter referred to as E), and as the case requires, from 0.001 to 10 mol % of a crosslinkable group-containing monomer.

The present invention further provides the above fluorinated elastomer latex, wherein the fluorinated elastomer is at least one member selected from the group consisting of a TFE/P copolymer, a TFE/P/VdF copolymer, a TFE/HFP copolymer, a VdF/HFP copolymer, a TFE/VdF/HFP copolymer, a $TFE/CF_2=CFOCF_3$ copolymer, a $TFE/CF_2=CFOC_3F_7$ copolymer, a $TFE/CF_2=CFOCF_3/CF_2=CFOC_3F_7$ copolymer, a $TFE/CF_2=C(OC_2F_5)_2$ copolymer, a TFE/methyl vinyl ether (hereinafter referred to as MVE) copolymer, a TFE/ethyl vinyl ether (hereinafter referred to as EVE) copolymer, a TFE/n-butyl vinyl ether (hereinafter referred to as BVE) copolymer, a TFE/EVE/BVE copolymer, a $VdF/CF_2=CFOC_3F_7$ copolymer, an E/HFP copolymer, and such a copolymer having a crosslinkable group-containing monomer further copolymerized therewith.

The present invention further provides the above fluorinated elastomer latex, wherein the fluorinated elastomer is at least one member selected from the group consisting of a TFE (40 to 60 mol %)/P (60 to 40 mol %) copolymer, a TFE (20 to 79 mol %)/P (79 to 20 mol %)/VdF (1 to 50 mol %) copolymer, a TFE (20 to 80 mol %)/HFP (80 to 20 mol %) copolymer, a VdF (50 to 95 mol %)/HFP (5 to 50 mol %) copolymer, a TFE (1 to 35 mol %)/VdF (45 to 90 mol %)/HFP (5 to 50 mol %) copolymer, a TFE (40 to 70 mol %)/$CF_2=CFOCF_3$ (60 to 30 mol %) copolymer, a TFE (40 to 70 mol %)/$CF_2=CFOC_3F_7$ (60 to 30 mol %) copolymer, a TFE (40 to 70 mol %)/$CF_2=C(OC_2F_5)_2$ (60 to 30 mol %) copolymer, a TFE (70 to 30 mol %)/MVE (30 to 70 mol %) copolymer, a TFE (70 to 30 mol %)/EVE (30 to 70 mol %) copolymer, a TFE (70 to 30 mol %)/BVE (30 to 70 mol %) copolymer, a TFE (60 to 30 mol %)/EVE (1 to 69 mol %)/BVE (1 to 69 mol %) copolymer, a VdF (40 to 70 mol %)/$CF_2=CFOC_3F_7$ (60 to 30 mol %) copolymer, an E (40 to 60 mol %)/HFP (60 to 40 mol %) copolymer, and such a copolymer having from 0.001 to 10 mol % of a crosslinkable group-containing monomer further copolymerized therewith.

The present invention further provides the above fluorinated elastomer latex, wherein the fluorinated emulsifier is $C_2F_5OCF_2CF_2OCF_2COOA$ (wherein A is a hydrogen atom, an alkali metal or $NH_4$).

The present invention further provides a method for producing a fluorinated elastomer latex, which comprises emulsion-polymerizing a fluoromonomer in an aqueous medium containing from 0.001 to 10.0 mass % of a fluorinated emulsifier represented by the formula (1):

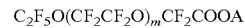

$C_2F_5O(CF_2CF_2O)_mCF_2COOA$ wherein A is a hydrogen atom, an alkali metal or $NH_4$, and m is an integer of from 1 to 3, to obtain a fluorinated elastomer latex.

The present invention further provides the above method for producing a fluorinated elastomer latex, wherein the fluoromonomer is at least one fluoromonomer selected from the group consisting of TFE, VdF, HFP, PAVE represented by $CF_2=C(OR^f)_nF_{2-n}$ (wherein $R^f$ is a $C_{1-9}$ perfluoroalkyl group or perfluoro(alkyloxyalkyl) group containing one or more ether bonds in its molecule, n is an integer of 1 or 2, and each carbon chain may be linear or contain branches, or may have a cyclic structure) and CTFE, and as the case requires, at least one hydrocarbon monomer selected from the group consisting of a vinyl ether represented by $CH_2=CHOR$ (wherein R is a $C_{1-8}$ alkyl group or alkyloxyalkyl group containing one or more ether bonds, and each carbon chain may be linear or contain branches, or may have a cyclic structure), P and E, and as the case requires, from 0.001 to 10 mol % of a crosslinkable group-containing monomer, is copolymerized therewith.

The present invention further provides the above method for producing a fluorinated elastomer latex, wherein the fluorinated emulsifier is $C_2F_5OCF_2CF_2OCF_2COOA$ (wherein A is a hydrogen atom, an alkali metal or $NH_4$).

The present invention further provides the above method for producing a fluorinated elastomer latex, wherein the fluoromonomer is emulsion-polymerized in the presence of $C_nF_mI_{2n+2-m}$ (wherein n is an integer of from 1 to 16, and m is an integer of from 1 to (2n+1)) as a chain transfer agent.

The present invention further provides a fluorinated elastomer obtained by coagulating the above fluorinated elastomer latex.

The present invention further provides the above fluorinated elastomer, which has a Mooney viscosity of from 5 to 200 as measured in accordance with JIS K6300 employing a large rotor with a diameter of 38.1 mm and a thickness of 5.54 mm at 100° C. setting the preheat time for one minute and the rotor rotation time for 4 minutes.

The present invention still further provides a fluororubber molded product obtained by crosslinking the above fluorinated elastomer.

The fluorinated elastomer latex of the present invention is excellent in dispersion stability of the fluorinated elastomer. According to the method for producing a fluorinated elastomer latex of the present invention, a fluorinated elastomer having a glass transition point of at most 20° C. can be produced, and further, the amount of the perfluoroemulsifier to be attached to the fluorinated elastomer after coagulation can be reduced and the number of washing can be reduced, whereby excellent productivity of the fluorinated elastomer latex and the fluorinated elastomer can be achieved. The fluorinated elastomer of the present invention has a low content of the fluorinated emulsifier represented by the formula (1), and is thereby excellent in environment and sanitation properties. The fluororubber molded product obtained by crosslinking the fluorinated elastomer of the present invention is excellent in physical properties.

Now, the present invention will be described in detail with reference to the preferred embodiments.

The fluorinated elastomer latex of the present invention may be produced by emulsion-polymerizing a fluoromonomer in an aqueous medium containing the fluorinated emulsifier represented by the formula (1), or may be produced by adding the fluorinated emulsifier represented by the formula (1) to a fluorinated elastomer latex produced by emulsion-polymerizing a fluoromonomer in an aqueous medium containing an emulsifier other than the fluorinated emulsifier represented by the formula (1)

The fluoromonomer to be subjected to emulsion polymerization may be at least one fluoromonomer selected from TFE, VdF, HFP, PAVE and CTFE. Such a fluoromonomer may be used alone or in combination of two or more of them.

Further, with the fluoromonomer, one or more copolymerizable hydrocarbon monomers selected from the group consisting of vinyl ether represented by $CH_2=CHOR$ (wherein R is a $C_{1-8}$ alkyl group or alkyloxyalkyl group containing one or more ether bonds, and each carbon chain may be linear or contain branches, or may have a cyclic structure), P and E may be copolymerized.

Further, another copolymerizable monomer other than the above monomer may be copolymerized. Such another copolymerizable monomer may be from 0.001 to 10 mol % of a crosslinkable group-containing monomer. Such a crosslinkable group may, for example, be a carbon-carbon double bond group, a halogen atom, an acid anhydride residue, a carboxyl group, an amino group, a cyano group or a hydroxyl group.

Specific examples of a preferred crosslinkable group-containing monomer include 1-bromo-1,1,2,2-tetrafluoroethyl trifluorovinyl ether (hereinafter referred to as BrVE), 1-iodo-1,1,2,2-tetrafluoroethyl trifluorovinyl ether, vinyl crotonate, vinyl methacrylate, maleic anhydride, itaconic anhydride, maleic acid, itaconic acid and heptafluoro-4-pentenenitrile. Such a crosslinkable group-containing monomer may be used alone or in combination of two or more of them. The proportion of such a crosslinkable group-containing monomer in the copolymer is preferably from 0.001 to 5 mol %, particularly preferably from 0.01 to 3 mol %.

Specific examples of a preferred fluorinated elastomer in the produced fluorinated elastomer latex include a TFE/P copolymer, a TFE/P/VdF copolymer, a TFE/HFP copolymer, a VdF/HFP copolymer, a TFE/VdF/HFP copolymer, a TFE/$CF_2=CFOCF_3$ copolymer, a TFE/$CF_2=CFOC_3F_7$ copolymer, a TFE/$CF_2=CFOCF_3$/$CF_2=CFOC_3F_7$ copolymer, a TFE/$CF_2=C(OC_2F_5)_2$ copolymer, a TFE/MVE copolymer, a TFE/EVE copolymer, a TFE/BVE copolymer, a TFE/EVE/BVE copolymer, a VdF/$CF_2=CFOC_3F_7$ copolymer, an E/HFP copolymer, and such copolymers having a crosslinkable group-containing monomer further copolymerized therewith.

Particularly preferred are a TFE/P copolymer, a TFE/P/VdF copolymer, a TFE/PAVE copolymer, a VdF/HFP copolymer, a TFE/VdF/HFP copolymer and such copolymers having a crosslinkable group-containing monomer further copolymerized therewith.

The molar ratio of polymerized units of the respective monomers in the copolymer is not particularly limited and may suitably be selected depending upon required characteristics. For example, the molar ratio of (the polymerized units of TFE)/(the polymerized units of P) in the TFE/P copolymer is preferably from 40/60 to 70/30, more preferably from 50/50 to 60/40.

Further, in the TFE/PAVE copolymer, the perfluoroalkyl group of PAVE has from 1 to 9 carbon atoms, and it may be linear or contain branches, or may have a cyclic structure or a mixture thereof. The perfluoroalkyl group is more preferably a $CF_3$ group or a $C_3F_7$ group. Further, the perfluoro(alkyloxyalkyl) group having one or more ether bonds of PAVE has from 1 to 9 carbon atoms, it has preferably four or less, more preferably two or less ether bonds, and it may be linear or contain branches, or may have a cyclic structure, or a mixture thereof. Such a perfluoro(alkyloxyalkyl) group is more preferably a $C_2F_5OC_2F_4$ group, a $C_3F_7OC_3F_6$ group or a $C_3F_7OC_3F_6OC_3F_6$ group.

In the TFE/PAVE copolymer, the molar ratio of (the polymerized units of TFE)/(the polymerized units of PAVE) is preferably from 85/15 to 25/75, more preferably from 75/25 to 40/60.

Specific examples of a particularly preferred fluorinated elastomer include a TFE (40 to 60 mol %)/P (60 to 40 mol %) copolymer, a TFE (20 to 79 mol %)/P (79 to 20 mol %)/VdF (1 to 50 mol %) copolymer, a TFE (20 to 80 mol %)/HFP (80 to 20 mol %) copolymer, a VdF (50 to 95 mol %)/HFP (5 to 50 mol %) copolymer, a TFE (1 to 35 mol %)/VdF (45 to 90 mol %)/HFP (5 to 50 mol %) copolymer, a TFE (40 to 70 mol %)/$CF_2=CFOCF_3$ (60 to 30 mol %) copolymer, a TFE (40 to 70 mol %)/$CF_2=CFOC_3F_7$ (60 to 30 mol %) copolymer, a TFE (40 to 70 mol %)/$CF_2=C(OC_2F_5)_2$ (60 to 30 mol %) copolymer, a TFE (70 to 30 mol %)/MVE (30 to 70 mol %)

copolymer, a TFE (70 to 30 mol %)/EVE (30 to 70 mol %) copolymer, a TFE (70 to 30 mol %)/BVE (30 to 70 mol %) copolymer, a TFE (60 to 30 mol %)/EVE (1 to 69 mol %)/BVE (1 to 69 mol %) copolymer, a VdF (40 to 70 mol %)/$CF_2$=$CFOC_3F_7$ (60 to 30 mol %) copolymer, an E (40 to 60 mol %)/HFP (60 to 40 mol %) copolymer, and such copolymers having a crosslinkable group-containing monomer further copolymerized therewith in an amount of from 0.001 to 10 mol %.

The TFE (40 to 60 mol %)/P (60 to 40 mol %) copolymer means a copolymer obtained by copolymerizing TFE and P in a ratio of 40 to 60 mol %:60 to 40 mol %, and the same applies to other copolymers.

Further, the TFE (40 to 60 mol %)/P (60 to 40 mol %) copolymer having a crosslinkable group-containing monomer further copolymerized therewith in an amount of from 0.001 to 10 mol %, means such a copolymer that the ratio of two components TFE and P in the copolymer is 40 to 60 mol %:60 to 40 mol %, and the proportion of the crosslinkable group-containing monomer in the copolymer is from 0.001 to 10 mol % based on the total amount of three monomer components. The same applies to other copolymers.

The fluorinated elastomer of the present invention preferably has a glass transition point of at most 20° C., more preferably at most 10° C., particularly preferably at most 5° C.

The fluorinated elastomer latex of the present invention is characterized by containing one type or more types of fluorinated emulsifiers represented by the formula (1):

$$C_2F_5O(CF_2CF_2O)_mCF_2COOA$$

wherein A is a hydrogen atom, an alkali metal or $NH_4$, and m is an integer of from 1 to 3.

The alkali metal as A may, for example, be lithium, sodium or potassium. A is particularly preferably $NH_4$ or sodium, and most preferably $NH_4$.

The following may be mentioned as examples of the fluorinated emulsifier.

In a case where A is a hydrogen atom, specific examples include $C_2F_5OCF_2CF_2OCF_2COOH$, $C_2F_5O(CF_2CF_2O)_2CF_2COOH$ and $C_2F_5O(CF_2CF_2O)_3CF_2COOH$.

In a case where A is lithium, specific examples include $C_2F_5OCF_2CF_2OCF_2COOLi$, $C_2F_5O(CF_2CF_2O)_2CF_2COOLi$ and $C_2F_5O(CF_2CF_2O)_3CF_2COOLi$.

In a case where A is sodium, specific examples include $C_2F_5OCF_2CF_2OCF_2COONa$, $C_2F_5O(CF_2CF_2O)_2CF_2COONa$ and $C_2F_5O(CF_2CF_2O)_3CF_2COONa$.

In a case where A is potassium, specific examples include $C_2F_5OCF_2CF_2OCF_2COOK$, $C_2F_5O(CF_2CF_2O)_2CF_2COOK$ and $C_2F_5O(CF_2CF_2O)_3CF_2COOK$.

In a case where A is $NH_4$, specific examples include $C_2F_5OCF_2CF_2OCF_2COONH_4$, $C_2F_5O(CF_2CF_2O)_2CF_2COONH_4$ and $C_2F_5O(CF_2CF_2O)_3CF_2COONH_4$.

In the present invention, the fluorinated emulsifier is preferably $C_2F_5O(CF_2CF_2O)_{1-2}CF_2COOA$ (wherein A is a hydrogen atom, an alkali metal or $NH_4$), more preferably $C_2F_5OCF_2CF_2OCF_2COONH_4$ or $C_2F_5O(CF_2CF_2O)_2CF_2COONH_4$, particularly preferably $C_2F_5OCF_2CF_2OCF_2COONH_4$.

In the method for producing a fluorinated elastomer latex of the present invention, a fluoromonomer is emulsion-polymerized in an aqueous medium containing the fluorinated emulsifier represented by the formula (1) in an amount of from 0.001 to 10.0 mass %. The content of the fluorinated emulsifier represented by the formula (1) in the aqueous medium is preferably from 0.001 to 5 mass %, particularly preferably from 0.01 to 3 mass %.

The aqueous medium may, for example, be water such as ion exchanged water, pure water or ultrapure water. The aqueous medium may contain a water soluble organic solvent. Such an organic solvent may, for example, be preferably an alcohol, a ketone, an ether, an ethylene glycol or a propylene glycol. The proportion of the organic solvent is preferably from 1 to 50 parts by mass, more preferably from 3 to 20 parts by mass per 100 parts by mass of water. The amount of water as the base for the proportion of the fluorinated emulsifier does not include the content of other additives such as a polymerization initiator.

The fluorinated emulsifier to be used in the present invention, as compared with known emulsifiers having no etheric oxygen such as ammonium perfluorooctanoate and emulsifiers in which a perfluoroalkyl group has a branched structure, has such characteristics that its aqueous solution tends to have a high dynamic surface tension when solutions having the same concentration are compared, and accordingly, the latex containing it has been considered to have low stability at the time of polymerization. However, it was found that the fluorinated emulsifier to be used in the present invention provides excellent stability of the latex at the time of polymerization, and the amount of the fluorinated emulsifier attached to the fluorinated elastomer after coagulation of the latex tends to be small.

As a polymerization initiator to be used for the emulsion polymerization, a conventional radical polymerization initiator may be employed, and a water soluble polymerization initiator is particularly preferred. Specific examples of the water soluble polymerization initiator include a persulfate such as ammonium persulfate, hydrogen peroxide, a redox polymerization initiator comprising a combination of such a persulfate or hydrogen peroxide with a reducing agent such as sodium hydrogen sulfite or sodium thiosulfate, an inorganic polymerization initiator of a system where a small amount of iron, a ferrous salt (such as ferrous sulfate), silver sulfate or the like coexist with such a redox polymerization initiator, and an organic polymerization initiator such as disuccinic peroxide or azobisisobutylamidine dihydrochloride.

The polymerization initiator may be added at the beginning of the emulsion polymerization or may be added during the emulsion polymerization. The amount of the polymerization initiator to be added is preferably from 0.0001 to 3 mass %, particularly preferably from 0.001 to 1 mass % based on the monomer to be used for the polymerization.

In a case where a redox initiator is employed, it is preferred to employ a pH buffer so as to adjust the pH of the polymerization medium to be within a range not to impair redox reactivity. The pH buffer may, for example, be disodium hydrogen phosphate, sodium dihydrogen phosphate or sodium carbonate, and it is preferably disodium hydrogen phosphate dihydrate or disodium hydrogen phosphate dodecahydrate.

Further, in a case where the redox initiator is employed, as metal ions which undergo redox reaction, various metals having a plurality of ionic valencies may be employed. Specifically, a transition metal such as iron, copper, manganese or chromium is preferred, and iron is particularly preferred.

Further, in order that the metal which undergoes redox reaction is present stably in the polymerization medium, it is preferred to employ a metal chelating agent. The metal chelating agent is preferably an ethylenediaminetetraacetic acid, more preferably disodium ethylenediaminetetraacetate dihydrate in view of water solubility.

As a redox reaction reagent in a case where the redox initiator is employed, it is preferred to employ a reducing agent. As the reducing agent, a sulfuric acid type sulfur-containing compound may be employed, and rongalite (chemical formula: $CH_2(OH)SO_2Na.2H_2O$) is particularly preferred. It is preferred to add the reducing agent suitably continuously during the polymerization, and it is preferred to adjust its pH to be the same as that of the polymerization medium so as not to change the pH of the polymerization medium at the time of its addition.

For the polymerization of the fluoromonomer, a chain transfer agent to control the molecular weight may be employed.

The chain transfer agent may, for example, be an alcohol such as methanol, ethanol or propanol, a chlorofluorohydrocarbon such as 1,3-dichloro-1,1,2,2,3-pentafluoropropane or 1,1-dichloro-1-fluoroethane, a hydrocarbon such as methane, ethane, propane, butane, pentane, hexane or cyclohexane, $C_nF_mI_{2n+2-m}$ (wherein n is an integer of from 1 to 16, and m is an integer of from 1 to 2n) or $R^{f3}$IBr (wherein $R^{f3}$ is a $C_{1-16}$ saturated polyfluoroalkylene group).

$C_nF_mI_{2n+2-m}$ is preferably $R^{f2}I_2$ (wherein $R^{f2}$ is a $C_{1-16}$ saturated polyfluoroalkylene group), more preferably 1,4-diiodoperfluorobutane, 1,6-diiodoperfluorohexane or 1,2,4-triiodoperfluorobutane. Further, $R^{f3}$IBr is preferably 1-bromo-4-iodoperfluorobutane. Such a chain transfer agent may be used alone or in combination of two or more of them. The amount of the chain transfer agent to be added is preferably from 0.001 to 10 mass %, more preferably from 0.01 to 10 mass %, based on the polymerizable monomer.

Conditions of the emulsion polymerization for production of the fluorinated elastomer latex of the present invention are selected depending upon the type of an aimed fluorinated elastomer, the proportion of the fluoromonomer in the copolymer, the decomposition temperature of the polymerization initiator, etc. The polymerization pressure is preferably at least 0 MPaG and at most 20 MPaG, particularly preferably at least 0.3 MPaG and at most 10 MPaG, especially preferably at least 0.3 MPaG and at most 5 MPaG. The polymerization temperature is preferably at least 0° C. and at most 100° C., particularly preferably at least 10° C. and at most 80° C.

The fluorinated elastomer latex of the present invention can be produced, as mentioned above, by an emulsion polymerization method in the presence of the fluorinated emulsifier represented by the formula (1).

Further, the fluorinated elastomer latex of the present invention is produced also preferably by emulsion-polymerizing a fluoromonomer in an aqueous medium containing an emulsifier other than the fluorinated emulsifier represented by the formula (1), such as a fluorinated emulsifier such as ammonium perfluorooctanoate, perfluorooctanoic acid, lithium perfluorooctanoate, sodium perfluorooctanoate, potassium perfluorooctanoate, $C_pF_{2p+1}O(CF_2CF_2O)_q$ $CF_2COOA$ (wherein A is a hydrogen atom, an alkali metal or $NH_4$, p is an integer of from 3 to 10, and q is 0 or an integer of from 1 to 3), or $R^{f4}$—$(OCH_2CF_2CF_2)_r$—O—$CH_sF_{s-2}CF_2$— $R^{f5}$—COOA (wherein $R^{f4}$ is a $C_{1-20}$ linear or branched fluoroalkyl group or fluoroalkyloxyalkyl group, r is 0 or an integer of from 2 to 3, s is 0, 1 or 2, $R^{f5}$ is a $C_{1-25}$ fluoroalkylene group, and A is a hydrogen atom, an alkali metal or $NH_4$), or a hydrocarbon emulsifier such as sodium dodecylbenzenesulfonate or sodium lauryl sulfate, to produce a fluorinated elastomer latex, to which the fluorinated emulsifier represented by the formula (1) is added to replace the above emulsifier. In the above production method, the content of the emulsifier other than the fluorinated emulsifier represented by the formula (1) in the aqueous medium is preferably from 0.03 to 10 mass %, more preferably from 0.05 to 5 mass %, based on the fluoropolymer.

Among the above production methods, particularly preferred is production by the emulsion polymerization method in the presence of the fluorinated emulsifier represented by the formula (1).

In the fluorinated elastomer latex of the present invention, the particle size of the fluorinated elastomer dispersed in the aqueous medium is preferably from 0.01 to 10 μm, more preferably from 0.01 to 5 μm, most preferably from 0.05 to 3 μm. The dispersion stability of the fluorinated elastomer will be excellent within this range.

In the fluorinated elastomer latex, the content of the fluorinated elastomer is preferably from 10 to 60 mass %, more preferably from 15 to 60 mass %, furthermore preferably from 15 to 50 mass %.

Further, in the fluorinated polymer latex, the content of the fluorinated emulsifier represented by the formula (1) is preferably from 0.03 to 10 mass %, more preferably from 0.05 to 5 mass %, on the basis of the mass of the fluoropolymer. Further, it is preferably from 0.001 to 5 mass %, more preferably from 0.01 to 3 mass %, on the basis of the mass of the aqueous medium.

Namely, the fluorinated polymer latex of the present invention preferably contains the aqueous medium, the fluorinated elastomer dispersed in the aqueous medium in an amount of from 10 to 60 mass %, and the fluorinated emulsifier represented by the formula (1) in an amount of from 0.03 to 10 mass % on the basis of the fluoropolymer. Further, it more preferably contains the aqueous medium, the fluorinated elastomer dispersed in the aqueous medium in an amount of from 15 to 60 mass % and the fluorinated emulsifier represented by the formula (1) in an amount of from 0.05 to 5 mass % on the basis of the fluoropolymer. Still further, it most preferably contains the aqueous medium, the fluorinated elastomer dispersed in the aqueous medium in an amount of from 15 to 50 mass %, and the fluorinated emulsifier represented by the formula (1) in an amount of from 0.05 to 5 mass % on the basis of the fluoropolymer.

To the fluorinated elastomer latex produced by the emulsion polymerization method, a coagulant may be added to coagulate the fluorinated elastomer.

As the coagulant, any coagulant which is commonly used for coagulation of a fluoropolymer latex may be used, and it may, for example, be a water soluble salt such as calcium chloride, magnesium chloride, aluminum chloride or aluminum nitrate, an acid such as nitric acid, hydrochloric acid or sulfuric acid, or a water soluble organic liquid such as an alcohol or acetone. The amount of the coagulant to be added is preferably from 0.001 to 20 parts by mass, particularly preferably from 0.01 to 10 parts by mass per 100 parts by mass of the fluorinated elastomer latex. Further, the fluorinated elastomer latex may be frozen for coagulation.

The coagulated fluorinated elastomer is preferably collected by filtration and washed with washing water. The washing water may, for example, be ion exchanged water, pure water or ultrapure water. The amount of the washing water may be from 1 to 5 times by mass to the fluorinated elastomer, whereby the amount of the emulsifier attached to the fluorinated elastomer can be sufficiently reduced by one washing. The number of washing is preferably as small as possible in view of operation efficiency, and it is more preferably from one to three times.

The fluorinated elastomer of the present invention to be obtained by coagulation is characterized in that the content of the fluorinated emulsifier represented by the formula (1) can be reduced. In the fluorinated elastomer of the present invention, the content of the fluorinated emulsifier represented by the formula (1) is preferably at most 1,000 mass ppm, more preferably at most 500 mass ppm, most preferably at most 300 mass ppm. Within this range, the fluorinated emulsifier will hardly diffuse by vaporization in the crosslinking formation step, such being excellent in environment and sanitation properties. Further, it will not be required to recover the vaporized fluorinated emulsifier.

The fluorinated emulsifier contained in a waste to be obtained by coagulation of the fluorinated elastomer latex of the present invention may be recovered and recycled by a known method. The recovery method may, for example, be a method of making the fluorinated emulsifier be adsorbed in a strongly basic anion exchange resin or a weakly basic anion exchange resin, a method of making it be adsorbed in a synthetic adsorbent, a method of making it be adsorbed in activated carbon, a method of making it be included in a layered double hydroxide, or a method of concentrating the waste liquid. The fluorinated emulsifier used in the present invention, recovered by the above method, may be recycled by a known method.

The fluorinated elastomer of the present invention preferably has a Mooney viscosity of from 5 to 200, more preferably from 10 to 200, as measured in accordance with JIS K6300 by means of a large rotor with a diameter of 38.1 mm and a thickness of 5.54 mm at 100° C. setting the preheat time for one minute and the rotor rotation time for 4 minutes. The Mooney viscosity is an index of the molecular weight of the fluorinated elastomer, and a high Mooney viscosity means a large molecular weight of the fluorinated elastomer. When the Mooney viscosity is within this range, excellent kneading operation efficiency and excellent rubber physical properties after crosslinking will be achieved.

The fluorinated elastomer of the present invention may undergo a crosslinking reaction by a known method. Specific examples of the crosslinking reaction include peroxide crosslinking, polyol crosslinking, amine crosslinking and triazine crosslinking. Peroxide crosslinking is preferably employed in view of productivity of a composition, heat resistance and chemical resistance.

An organic peroxide in the peroxide crosslinking is a crosslinker and is preferably one which generates peroxide radicals e.g. by heating. Specifically, it may, for example, be a dialkyl peroxide such as di-tert-butyl peroxide, tert-butyl cumyl peroxide, dicumyl peroxide, α,α-bis(tert-butylperoxy)-p-diisopropylbenzene, 1,3-bis(tert-butylperoxyisopropyl)benzene, 2,5-dimethyl-2,5-di-(tert-butylperoxy)hexane or 2,5-dimethyl-2,5-di-(tert-butylperoxy)hexane-3,1,1-bis(tert-butylperoxy)-3,3,5-trimethylcyclohexane, 2,5-dimethylhexane-2,5-dihydroxyperoxide, benzoyl peroxide, tert-butylperoxybenzene, 2,5-dimethyl-2,5-di-(benzoylperoxy)hexane, tert-butyl peroxymaleic acid or tert-butylperoxyisopropyl carbonate. A dialkyl peroxide is particularly preferred. In general, the type of the organic peroxide to be used and its content in the fluorinated elastomer composition are selected depending upon the activity of the organic peroxide, the decomposition temperature, etc.

The content of the organic peroxide is from 0.3 to 10 parts by mass per 100 parts by mass of the fluorinated elastomer. Physical properties of vulcanizate with strength and elongation being well balanced will be obtained within this range. It is preferably from 0.3 to 5 parts by mass, particularly preferably from 0.5 to 3 parts by mass.

The fluorinated elastomer of the present invention preferably contains a crosslinking coagent. When it contains a crosslinking coagent, radicals to be formed will effectively react with the crosslinking coagent, thus increasing the crosslinking efficiency. The crosslinking coagent may be a compound having reaction activity with peroxide radicals and radicals to be formed on the molecular chain of the fluorinated elastomer.

Specifically, crosslinking coagent may, for example, be triallyl cyanurate, triallyl isocyanurate, a triallyl isocyanurate oligomer, trimethallyl isocyanurate, triacrylformal, triallyl trimellitate, N,N'-m-phenylenebismaleimide, p-quinonedioxime, p,p'-benzoylquinone dioxime, dipropargyl terephthalate, diallyl phthalate, N,N',N'',N'''-tetraallyl terephthalamide, or a vinyl group-containing cyloxane oligomer such as polymethylvinylsiloxane or polymethylphenylvinylsiloxane. Particularly preferred is triallyl cyanurate, triallyl isocyanurate or trimethallyl isocyanurate, and especially preferred is triallyl isocyanurate.

The content of the crosslinking coagent is preferably from 0.1 to 10 parts by mass, more preferably from 0.5 to 5 parts by mass per 100 parts by mass of the fluorinated elastomer. Physical properties of vulcanizate with strength and elongation being well balanced will be obtained within this range.

Further, at the time of crosslinking the fluorinated elastomer of the present invention, a pigment for coloring, a filler, a reinforcing agent or the like may be blended. As the filler or the reinforcing agent, carbon black, titanium oxide, silicon dioxide, clay, talc, or a fluororesin such as polytetrafluoroethylene, polyvinylidene fluoride, polyvinyl fluoride, polychlorotrifluoroethylene, a tetrafluoroethylene/ethylene copolymer or a tetrafluoroethylene/vinylidene fluoride copolymer may, for example, be mentioned.

The fluororubber molded product of the present invention can be obtained by carrying out molding together with crosslinking.

The molding may be carried out simultaneously with the crosslinking, or may be carried out before or after the crosslinking. The molding is not particularly limited, and various molding methods such as pressure molding, compression molding, extrusion and injection molding may be mentioned.

The crosslinking reaction is carried out preferably at from 150 to 300° C. When the crosslinking is carried out at a temperature within this range, a fluororubber molded product excellent in physical properties of vulcanizate will be obtained. The crosslinking reaction is carried out usually combining a primary crosslinking (press curing) reaction at a relatively low temperature and a secondary crosslinking (post curing) reaction at a relatively high temperature. The temperature for the primary crosslinking reaction is usually preferably from 150 to 190° C. The temperature for the secondary crosslinking reaction is usually preferably from 170 to 300° C.

Now, the present invention will be explained in further detail with reference to Examples. However, it should be understood that the present invention is by no means restricted to such specific Examples.

Amount of Perfluoroemulsifier Remaining in Polymer 10 g of a dried fluorinated elastomer is subjected to a Soxhlet extractor at 100° C. for 8 hours employing ethanol as a solvent to extract an ethanol soluble component. The concentration of the perfluoroemulsifier in the obtained extract is quantitatively analyzed by means of liquid chromatography mass spectroscopy, to determine the amount of the perfluoro emulsifier remaining in the polymer after washing.

Mooney Viscosity

Measured in accordance with JIS K6300 employing a large rotor with a diameter of 38.1 mm and a thickness of 5.54 mm at 100° C. setting the preheat time for one minute and the rotor rotation time for 4 minutes.

Measurement of Physical Properties of Vulcanizate

The tensile strength and the elongation of a crosslinked fluororubber were measured in accordance with JIS K6251 employing a sample punched out from a vulcanizate sheet with a thickness of 2 mm by means of a #3 dumbbell. Further, the hardness was measured in accordance with JIS K6253.

EXAMPLE 1

Into an autoclave made of stainless steel, having an internal volume of 3,200 cc, equipped with a stirrer, 1,500 g of ion exchanged water, 40 g of disodium hydrogen phosphate dodecahydrate, 0.5 g of sodium hydroxide, 198 g of tert-butanol, 8 g of $C_2F_5OCF_2CF_2OCF_2COONH_4$ (hereinafter referred to as EEA) and 2.5 g of ammonium persulfate were charged. Further, an aqueous solution having 0.4 g of EDTA (disodium ethylenediaminetetraacetate dihydrate, the same applies hereinafter) and 0.3 g of ferrous sulfate heptahydrate preliminarily dissolved in 200 g of ion exchanged water was further charged. TFE and P were introduced so that the molar ratio of TFE/P would be 85/15 and the internal pressure of the reactor at 25° C. would be 2.5 MPaG. A stirring machine was rotated at 300 rpm, and 2.5 mass % of a Rongalite aqueous solution was added to initiate the polymerization reaction.

Along with the initiation of the polymerization reaction, the internal pressure of the reactor decreased by 0.01 MPaG, whereupon a preliminarily prepared TFE/P mixed gas with a molar ratio of 56/44 was introduced, to increase the internal pressure of the reactor to be 2.51 MPaG. This operation was repeatedly carried out by sequentially adding the TFE/P mixed gas so that the internal pressure of the reactor would be from 2.49 to 2.51 MPaG, to continue the polymerization reaction. When the total amount of the mixed gas added reached 800 g, addition of the Rongalite aqueous solution was stopped, the internal temperature of the reactor was decreased to 10° C. to terminate the polymerization reaction. 30.0 g of the Rongalite aqueous solution was consumed by the polymerization. In such a manner, a TFE/P copolymer latex containing EEA was obtained. The mass of the latex was 2,650 g.

The latex was added to 4,000 g of a 1.5 mass % calcium chloride aqueous solution to coagulate the latex by salt coagulation thereby to obtain a TFE/P copolymer. This copolymer was collected by filtration, washed with 3,500 g of ion exchanged water and subjected to filtration so that the copolymer was washed three times in total. The copolymer collected by filtration was dried at 120° C. for 12 hours to obtain 795 g of a white TFE/P copolymer. The amount of remaining EEA was 100 mass ppm. Further, the glass transition temperature of the copolymer was −0.5° C. The Mooney viscosity was 180. The fluorine content of the obtained fluorinated elastomer was 58.2 mass %, and the TFE/P copolymer had such a composition that (the polymerized units based on TFE)/(the polymerized units based on P)=56.3/43.7 (molar ratio), as calculated based on the fluorine content.

100 Parts by mass of the TFE/P copolymer subjected to a heat treatment at 300° C., 30 parts by mass of MT carbon, 5 parts by mass of triallyl isocyanurate, 1 part by mass of 1,3-bis(tert-butylperoxyisopropyl)benzene (Perkadox 14, manufactured by Kayaku Akzo Corporation) and 1 part by mass of sodium stearate were kneaded by a twin roll to obtain a fluorinated elastomer compound. The compound was subjected to primary crosslinking by means of a pressing machine at 170° C. for 20 minutes and then subjected to secondary crosslinking in an oven at 200° C. for 4 hours to obtain a fluororubber vulcanizate sheet with a thickness of 2 mm. Physical properties of the fluororubber vulcanizate are shown in Table 1.

EXAMPLE 2

Into an autoclave made of stainless steel, having an internal volume of 2,100 cc, equipped with a stirrer, 1,500 g of ion exchanged water, 17 g of EEA and 300 g of perfluoro (propyl vinyl ether) (hereinafter referred to as PPVE) were charged. While stirring by an anchor blade at a rate of 300 rpm, the internal temperature was increased to 60° C. After the internal temperature reached 60° C., TFE was introduced so that the internal pressure of the reactor would be 1.0 MPaG. 5 mL of a 2.5 mass % ammonium persulfate aqueous solution was added to initiate the polymerization reaction. Along with progress of the polymerization, the internal pressure of the reactor decreased by 0.01 MPaG, whereupon TFE was introduced to increase the internal pressure of the reactor to be 1.01 MPaG. This operation was repeatedly carried out by successively adding the TFE gas so that the internal pressure of the reactor would be from 0.99 to 1.01 MPaG, to continue the polymerization reaction.

15 mL of a preliminarily prepared PPVE/BrVE mixed liquid with a molar ratio of 98/2 was charged to the reactor according to every addition of 15 g of the TFE gas. Addition of the mixed liquid was continued until 105 g of TFE was consumed. The mixed liquid was added seven times in total in an amount of 105 mL. When the total amount of the TFE gas added reached 120 g, addition of TFE was stopped, and the internal temperature of the reactor was decreased to 10° C. to terminate the polymerization reaction. The polymerization time was about 4.5 hours. In such a manner, a TFE/PPVE copolymer latex containing EEA was obtained. The mass of the latex was 2,130 g.

The latex was added to 3,000 g of a 3.6 N hydrochloric acid aqueous solution, and the latex was coagulated by pH adjustment to obtain a TFE/PPVE/BrVE copolymer. The copolymer was subjected to filtration and washed with ultrapure water. Washing was carried out three times, and the amount of ultrapure water used for one washing was 1,500 g. The copolymer was dried at 120° C. for 12 hours to obtain 380 g of a white and transparent TFE/PPVE/BrVE copolymer.

The obtained TFE/PPVE/BrVE copolymer had such a composition that (the polymerized units based on TFE)/(the polymerized units based on PPVE)/(the polymerized units based on BrVE)=54/44/2 (molar ratio). The amount of remaining EEA was 80 mass ppm. The glass transition temperature of the copolymer was 0.5° C. The Mooney viscosity was 95.

100 Parts by mass of the TFE/PPVE/BrVE copolymer, 20 parts by mass of MT carbon, 5 parts by mass of triallyl isocyanurate, 1 part by mass of 1,3-bis(tert-butylperoxyisopropyl) benzene (Perkadox 14, manufactured by Kayaku Akzo Corporation) and 3 parts by mass of magnesium oxide were kneaded by a twin roll to obtain a fluorinated elastomer compound. The compound was subjected to primary crosslinking by means of a pressing machine at 170° C. for 20 minutes and then subjected to secondary crosslinking in an oven at 200° C. for 4 hours to obtain a fluororubber vulcanizate sheet with a thickness of 2 mm. Physical properties of the fluororubber vulcanizate are shown in Table 1.

EXAMPLE 3

Into an autoclave made of stainless steel, having an internal volume of 2,100 cc, equipped with a stirrer, 708 g of ion exchanged water, 7.08 g of EEA, 0.6 g of sodium hydrogen phosphate dodecahydrate, 1.62 g of 1,4-diiodoperfluorobutane and 50 g of perfluoro(methyl vinyl ether) (hereinafter referred to as PMVE) were charged. While stirring by an anchor blade at a rate of 600 rpm, the internal temperature was increased to 80° C. After the internal temperature reached 80° C., TFE was introduced by its own pressure so that the internal pressure of the reactor would be 0.6 MPaG. 10 mL of a 0.5 mass % ammonium persulfate aqueous solution was added to initiate the polymerization reaction. Along with progress of the polymerization, the internal pressure of the reactor decreased by 0.01 MPaG, whereupon TFE was introduced to increase the internal pressure of the reactor to be 0.61 MPaG. This operation was repeatedly carried out by successively adding a TFE gas so that the internal pressure of the reactor would be from 0.59 to 0.61 MPaG, to continue the polymerization reaction.

After 8 g of the TFE gas was added, 10 mL of PMVE was charged into the reactor by nitrogen pressure according to every addition of 16 g of the TFE gas. Addition of PMVE was continued until 136 g of TFE was consumed. PMVE was added nine times in total in an amount of 90 mL. At points where the addition amount of the TFE gas was 50 g and 100 g, 10 mL of a 0.5 mass % ammonium persulfate aqueous solution was added. When the total amount of the TFE gas added reached 140 g, addition of TFE was stopped, and the internal temperature of the reactor was decreased to 10° C. to terminate the polymerization reaction. The polymerization time was about 17 hours. In such a manner, a TFE/PMVE copolymer latex containing EEA was obtained. The mass of the latex was 1,012 g.

The latex was added to 1,500 g of a 3 mass % potassium aluminum sulfate aqueous solution, and the latex was coagulated by salt coagulation to obtain a TFE/PMVE copolymer. The copolymer was subjected to filtration and washed with ultrapure water. The washing was carried out three times, and the amount of the ultrapure water used for one washing was 1,200 g. The copolymer was vacuum dried at 50° C. for 24 hours to obtain 250 g of a white transparent iodine-containing TFE/PMVE copolymer.

The obtained TFE/PMVE copolymer had such a composition that (the polymerized units based on TFE)/(the polymerized units based on PMVE)=68/32 (molar ratio). The amount of remaining EEA was 50 mass ppm. Further, the glass transition temperature of the copolymer was −4.7° C. The Mooney viscosity was 25.

100 Parts by mass of the iodine-containing TFE/PMVE copolymer, 20 parts by mass of MT carbon, 5 parts by mass of triallyl isocyanurate, 1 part by mass of 2,5-dimethyl-2,5-di-(tert-butylperoxy)hexane (Perhexa 25B, manufactured by NOF CORPORATION) and 0.5 part by mass of o-phenylphenol were kneaded by a twin roll to obtain a fluorinated elastomer compound. The compound was subjected to primary crosslinking by means of a pressing machine at 170° C. for 20 minutes and then subjected to secondary crosslinking in an oven at 250° C. for 4 hours to obtain a fluororubber vulcanizate sheet with a thickness of 2 mm. Physical properties of the fluororubber vulcanizate are shown in Table 1.

EXAMPLE 4

Into an autoclave made of stainless steel, having an internal volume of 2,100 cc, equipped with a stirrer, 840 g of ion exchanged water and 1.68 g of EEA were charged, and the system in the reactor was replaced with nitrogen, and then the internal temperature was increased to 80° C. while stirring by means of an anchor blade at a rate of 600 rpm. After the internal temperature reached 80° C., a preliminarily prepared mixed gas of VdF/HFP=65/35 (molar ratio) was introduced so that the internal pressure of the reactor would be 0.75 MPaG. 10 mL of a 2.0 mass % ammonium persulfate aqueous solution was added to initiate the polymerization reaction. Along with progress of the polymerization, the internal pressure of the reactor decreased by 0.01 MPaG, whereupon a preliminarily prepared mixed gas of VdF/HFP=78/22 (molar ratio) was introduced by its own pressure to increase the internal pressure of the reactor to be 0.76 MPaG. This operation was repeatedly carried out by successively adding the mixed gas of VdF/HFP=78/22 (molar ratio) so that the internal pressure of the reactor would be from 0.74 to 0.76 MPaG, to continue the polymerization reaction.

When the total amount of the mixed gas of VdF/HFP=78/22 (molar ratio) reached 50 g, supply of VdF/HFP mixed gas was stopped, and the internal temperature of the reactor was decreased to 10° C. to terminate the polymerization reaction. The polymerization time was about 3 hours. In such a manner, a VdF/HFP copolymer latex containing EEA was obtained. The mass of the latex was 895 g.

The latex was added to 1,500 g of a 3 mass % potassium aluminum sulfate aqueous solution, and the latex was coagulated by salt coagulation to obtain a VdF/HFP copolymer. The copolymer was subjected to filtration and washed with ultrapure water. The washing was carried out three times, and the amount of the ultrapure water used for one washing was 1,200 g. The copolymer was dried at 120° C. for 12 hours to obtain 49 g of a white VdF/HFP copolymer.

The obtained VdF/HFP copolymer had such a composition that (the polymerized unit based on VdF)/(the polymerized units based on HFP)=78/22 (molar ratio). The amount of EEA remaining in the VdF/HFP copolymer was 300 mass ppm. Further, the glass transition temperature of the copolymer was −20.5° C. The Mooney viscosity was 30.

100 Parts by mass of the VdF/HFP copolymer, 20 parts by mass of MT carbon, 4 parts by mass of triallyl isocyanurate and 1.5 parts by mass of 2,5-dimethyl-2,5-di-(tert-butylperoxy)hexane (Perhexa 25B, manufactured by NOF CORPORATION) were kneaded by a twin roll to obtain a fluorinated elastomer compound. The compound was subjected to primary crosslinking by means of a pressing machine at 160° C. for 10 minutes and then subjected to secondary crosslinking in an oven at 180° C. for 4 hours to obtain a fluororubber vulcanizate sheet with a thickness of 2 mm. Physical properties of the fluororubber vulcanizate are shown in Table 1.

EXAMPLE 5

After an autoclave made of stainless steel, having an internal volume of 3,200 mL, equipped with an anchor blade for stirring, was deaerated, 1,600 g of ion exchanged water, 40 g of disodium hydrogen phosphate dodecahydrate, 0.5 g of sodium hydroxide, 97 g of tert-butanol, 9 g of EEA and 2.5 g of ammonium persulfate were charged. Further, an aqueous solution having 0.4 g of disodium ethylenediaminetetraacetate dihydrate (hereinafter referred to as EDTA) and 0.3 g of ferrous sulfate heptahydrate preliminarily dissolved in 200 g of ion exchanged water, was charged. Then, a monomer mixed gas of TFE/P=85/15 (molar ratio) was introduced at 40° C. so that the internal pressure of the reactor would be 2.50 MPaG. The anchor blade was rotated at 300 rpm, and a 2.5 mass % aqueous solution of sodium hydroxymethanesulfinate dihydrate (hereinafter sometimes referred to as rongalite) having pH adjusted to 10.0 by sodium hydroxide (hereinafter this aqueous solution will be referred to as a rongalite 2.5 mass % aqueous solution) was added to initiate the polymerization reaction. Then, the rongalite 2.5 mass % aqueous solution was continuously added by means of a high pressure pump.

Since the pressure decreased along with progress of the polymerization, when the internal pressure of the reactor decreased to 2.49 MPaG, a mixed gas of TFE/P=56/44 (molar ratio) was introduced by its own pressure to increase the internal pressure of the reactor to be 2.51 MPaG. This operation was repeatedly carried out to maintain the internal pressure of the reactor to be from 2.49 to 2.51 MPaG to continue the polymerization reaction. When the amount of the TFE/P mixed gas added reached 10 g, 2 mL of a preliminarily prepared solution of vinyl crotonate (hereinafter referred to as VCR)/tert-butanol=5/95 (mass ratio) was charged into the reactor by nitrogen back pressure. Further, until the amount of the TFE/P mixed gas added reached 790 g, 2 mL of the tert-butanol solution of VCR was added according to every addition of 10 g of the TFE/P mixed gas, and totally 158 mL of the solution was charged. When the total amount of the TFE/P mixed gas added reached 800 g, addition of the rongalite 2.5 mass % aqueous solution was stopped, and the internal temperature of the reactor was decreased to 10° C. to terminate the polymerization reaction, thereby to obtain a TFE/P/VCR copolymer latex. The amount of the rongalite 2.5 mass % aqueous solution used was 45 g.

The latex was added to a 5 mass % aqueous solution of calcium chloride, and the latex was coagulated by salt coagulation so that a TFE/P/VCR copolymer deposited. The copolymer was collected by filtration, washed with ion exchanged water and dried in an oven at 120° C. for 12 hours to obtain 798 g of a white TFE/P/VCR copolymer. As a result of infrared absorption spectroscopy and $^{13}C$-NMR, the copolymer had such a composition that (the polymerized units based on TFE)/(the polymerized units based on P)/(the polymerized units based on VCR)=55.8/44.2/0.2 (molar ratio). Further, the Mooney viscosity was 120, the glass transition temperature was −0.5° C., and the amount of remaining EEA was 90 mass ppm.

100 Parts by mass of the TFE/P/VCR copolymer, 30 parts by mass of MT carbon, 5 parts by mass of triallyl isocyanurate, 1 part by mass of 1,3-bis(tert-butylperoxyisopropyl) benzene (Perkadox 14, manufactured by Kayaku Akuzo Corporation) and 1 part by mass of magnesium oxide were kneaded by a twin roll to obtain a fluorinated elastomer compound. The compound was subjected to primary crosslinking by means of a pressing machine at 170° C. for 20 minutes and then subjected to secondary crosslinking in an oven at 200° C. for 4 hours to obtain a fluororubber vulcanizate sheet with a thickness of 2 mm. Physical properties of the fluororubber vulcanizate are shown in Table 1.

COMPARATIVE EXAMPLE 1

A TFE/P copolymer latex was obtained in the same manner as in Example 1 except that ammonium perfluorooctanoate (hereinafter referred to as APFO) was employed as the emulsifier. The latex was subjected to coagulation, washing and drying in the same manner as in Example 1 to obtain 786 g of a TFE/P copolymer. The copolymer had a fluorine content of 57.9 mass %, and had such a composition that (the polymerized units based on TFE)/(the polymerized units based on P)=55.8/44.2 (molar ratio), as calculated on the basis of the fluorine content. The amount of remaining APFO was 2,300 mass ppm. Further, the glass transition temperature of the copolymer was −0.3° C. The Mooney viscosity was 178. A fluororubber vulcanizate sheet was obtained in the same manner as in Example 1, and its physical properties are shown in Table 1.

COMPARATIVE EXAMPLE 2

369 g of a TFE/PPVE/BrVE copolymer was obtained in the same manner as in Example 2 except that APFO was employed as the emulsifier instead of EEA. The polymerization time was about 5.5 hours. As a result of analysis by $^{19}F$-NMR, the copolymer had such a composition that (the polymerized units based on TFE)/(the polymerized units based on PPVE)/(the polymerized units based on BrVE)=59/39/2 (molar ratio). The amount of remaining APFO was 1,300 ppm. Further, the glass transition temperature of the copolymer was −0.1° C. The Mooney viscosity was 90. A fluororubber vulcanizate sheet was obtained in the same manner as in Example 2, and its physical properties are shown in Table 1.

COMPARATIVE EXAMPLE 3

220 g of an iodine containing TFE/PMVE copolymer was obtained in the same manner as in Example 3 except that APFO was employed as the emulsifier instead of EEA. As a result of analysis by $^{19}F$-NMR, the copolymer had such a composition that (the polymerized units based on TFE)/(the polymerized units based on PPVE)=67/33 (molar ratio). The amount of remaining APFO was 1,200 ppm. Further, the glass transition temperature of the copolymer was −4.8° C. The Mooney viscosity was 23. A fluororubber vulcanizate sheet was obtained in the same manner as in Example 3, and its physical properties are shown in Table 1.

COMPARATIVE EXAMPLE 4

48 g of a VdF/HFP copolymer was obtained in the same manner as in Example 4 except that APFO was employed as the emulsifier instead of EEA. As a result of analysis by $^{19}F$-NMR, the copolymer had such a composition that (the polymerized units based on VdF)/(the polymerized units based on HFP)=77/23 (molar ratio). The amount of remaining APFO was 3,000 ppm. Further, the glass transition temperature of the copolymer was −20.0° C. The Mooney viscosity was 32. A fluororubber vulcanizate sheet was obtained in the same manner as in Example 4, and its physical properties are shown in Table 1.

TABLE 1

| | Ex. 1 | Ex. 2 | Ex. 3 | Ex. 4 | Ex. 5 | Comp Ex. 1 | Comp Ex. 2 | Comp Ex. 3 | Comp Ex. 4 |
|---|---|---|---|---|---|---|---|---|---|
| Copolymer composition | TFE/P | TFE/ PPVE/ BrVE | TFE/PMVE (containing iodine) | VdF/ HFP | TFE/P/ VCR | TFE/P | TFE/ PPVE/ BrVE | TFE/PMVE (containing iodine) | VdF/ HFP |

TABLE 1-continued

|  | Ex. 1 | Ex. 2 | Ex. 3 | Ex. 4 | Ex. 5 | Comp Ex. 1 | Comp Ex. 2 | Comp Ex. 3 | Comp Ex. 4 |
|---|---|---|---|---|---|---|---|---|---|
| Amount of remaining emulsifier (mass ppm) | 100 | 80 | 50 | 300 | 90 | 2,300 | 1,300 | 1,200 | 3,000 |
| Glass transition temperature (° C.) | −0.5 | 0.5 | −4.7 | −20.5 | −0.5 | −0.3 | 0.1 | −4.8 | −20.0 |
| Mooney viscosity | 180 | 95 | 25 | 30 | 120 | 178 | 90 | 23 | 32 |
| Tensile strength (MPa) | 16.2 | 18.0 | 20.8 | 20.5 | 18.0 | 16.1 | 17.0 | 20.0 | 20.0 |
| Elongation (%) | 300 | 230 | 188 | 400 | 185 | 290 | 220 | 190 | 410 |
| 100% modulus (MPa) | 3.7 | 8.0 | 10.3 | 2.0 | 6.7 | 3.7 | 8.0 | 10.0 | 2.0 |
| Hardness (Shore A) | 70 | 75 | 86 | 66 | 71 | 70 | 75 | 85 | 66 |

The fluorinated elastomer latex of the present invention is useful for production of a fluorinated elastomer. Further, it can be useful as an aqueous coating by blending various additives. The fluorinated elastomer of the present invention is excellent in heat resistance, oil resistance, chemical resistance, solvent resistance, non-cohesive properties, electrical characteristics, sanitation properties, etc., and it is thereby widely used for applications including semiconductor production industry, chemical industry, food industry, petroleum industry, electrical industry, engineering industry and automotive industry, as a sealing material, an O-ring, a tube, a hose, a diaphragm, a belt, a wire coating material, a lining material, etc.

The entire disclosures of Japanese Patent Application No. 2005-61233 filed on Mar. 4, 2005 and Japanese Patent Application No. 2005-291572 filed on Oct. 4, 2005 including specifications, claims and summaries are incorporated herein by reference in their entireties.

What is claimed is:

1. A method for producing a fluorinated elastomer latex, which comprises emulsion-polymerizing a fluoromonomer in an aqueous medium to obtain the fluorinated elastomer latex, said aqueous medium comprising from 0.001 to 10.0 mass % of a fluorinated emulsifier represented by the formula (1):

$C_2F_5O(CF_2CF_2O)_mCF_2COOA$ wherein

A is a hydrogen atom, an alkali metal or $NH_4$, and m is 1, and an amount of the fluorinated emulsifier remaining in the fluorinated elastomer is at most 1000 ppm, wherein said amount is obtained without the aid of purification of the fluorinated elastomer latex.

2. The method for producing a fluorinated elastomer latex according to claim 1, wherein the fluoromonomer is at least one fluoromonomer selected from the group consisting of tetrafluoroethylene, vinylidene fluoride, hexafluoropropylene, a perfluoro(alkyl or alkyloxyalkyl vinyl ether) represented by $CF_2=C(OR^f)_nF_{2-n}$ (wherein $R^f$ is a $C_{1-9}$ perfluoroalkyl group or perfluoro(alkyloxyalkyl) group containing one or more ether bonds in its molecule, n is an integer of 1 or 2, and each carbon chain may be linear or contain branches, or may have a cyclic structure) and chlorotrifluoroethylene, and optionally, at least one hydrocarbon monomer selected from the group consisting of a vinyl ether represented by $CH_2=CHOR$ (wherein R is a $C_{1-8}$ alkyl group or alkyloxyalkyl group containing one or more ether bonds, and each carbon chain may be linear or contain branches, or may have a cyclic structure), propylene and ethylene, and optionally, from 0.001 to 10 mol % of a crosslinkable group-containing monomer, is copolymerized therewith.

3. The method for producing a fluorinated elastomer latex according to claim 1, wherein the fluorinated elastomer is at least one member selected from the group consisting of a tetrafluoroethylene/propylene copolymer, a tetrafluoroethylene/propylene/vinylidene fluoride copolymer, a tetrafluoroethylene/hexafluoropropylene copolymer, a vinylidene fluoride/hexafluoropropylene copolymer, a tetrafluoroethylene/vinylidene fluoride/hexafluoropropylene copolymer, a tetrafluoroethylene/$CF_2=CFOCF_3$ copolymer, a tetrafluoroethylene/$CF_2=CFOC_3F_7$ copolymer, a tetrafluoroethylene/$CF_2=CFOCF_3$/$CF_2=CFOC_3F_7$ copolymer, a tetrafluoroethylene/$CF_2=C(OC_2F_5)_2$ copolymer, a tetrafluoroethylene/methyl vinyl ether copolymer, a tetrafluoroethylene/ethyl vinyl ether copolymer, a tetrafluoroethylene/n-butyl vinyl ether copolymer, a tetrafluoroethylene/ethyl vinyl ether/n-butyl vinyl ether copolymer, a vinylidene fluoride/$CF_2=CFOC_3F_7$ copolymer, an ethylene/hexafluoropropylene copolymer, and such a copolymer having a crosslinkable group-containing monomer further copolymerized therewith.

4. The method for producing a fluorinated elastomer latex according to claim 1, wherein the fluorinated elastomer is at least one member selected from the group consisting of a tetrafluoroethylene (40 to 60 mol %)/propylene (60 to 40 mol %) copolymer, a tetrafluoroethylene (20 to 79 mol %)/propylene (79 to 20 mol %)/vinylidene fluoride (1 to 50 mol %) copolymer, a tetrafluoroethylene (20 to 80 mol %)/hexafluoropropylene (80 to 20 mol %) copolymer, a vinylidene fluoride (50 to 95 mol %)/hexafluoropropylene (5 to 50 mol %) copolymer, a tetrafluoroethylene (1 to 35 mol %)/vinylidene fluoride (45 to 90 mol %)/hexafluoropropylene (5 to 50 mol %) copolymer, a tetrafluoroethylene (40 to 70 mol %)/$CF_2=CFOCF_3$ (60 to 30 mol %) copolymer, a tetrafluoroethylene (40 to 70 mol %)/$CF_2=CFOC_3F_7$ (60 to 30 mol %) copolymer, a tetrafluoroethylene (40 to 70 mol %)/$CF_2=C(OC_2F_5)_2$ (60 to 30 mol %) copolymer, a tetrafluoroethylene (70 to 30 mol %)/methyl vinyl ether (30 to 70 mol %) copolymer, a tetrafluoroethylene (70 to 30 mol %)/ethyl vinyl ether (30 to 70 mol %) copolymer, a tetrafluoroethylene (70 to 30 mol %)/n-butyl vinyl ether (30 to 70 mol %) copolymer, a tetrafluoroethylene (60 to 30 mol %)/ethyl vinyl ether (1 to 69 mol %)/n-butyl vinyl ether (1 to 69 mol %) copolymer, a vinylidene fluoride (40 to 70 mol %)/$CF_2$=$CFOC_3F_7$ (60 to 30 mol %) copolymer, an ethylene (40 to 60 mol %)/hexafluoropropylene (60 to 40 mol %) copolymer, and such a copolymer having from 0.001 to 10 mol % of a crosslinkable group-containing monomer further copolymerized therewith.

5. The method for producing a fluorinated elastomer latex according to claim 1, wherein the fluorinated elastomer is a tetrafluoroethylene (40 to 60 mol %)/propylene (60 to 40 mol %) copolymer.

6. The method for producing a fluorinated elastomer latex according to claim 1, wherein the fluoromonomer is emulsion-polymerized in the presence of $C_nF_mI_{2n+2-m}$ (wherein n is an integer of from 1 to 16, and m is an integer of from 1 to (2n+1)) as a chain transfer agent.

7. The method for producing a fluorinated elastomer latex according to claim 1, wherein the aqueous medium comprises from 0.001 to 5.0 mass % of the fluorinated emulsifier.

8. The method for producing a fluorinated elastomer latex according to claim 1, wherein the aqueous medium comprises from 0.01 to 3.0 mass % of the fluorinated emulsifier.

9. The method for producing a fluorinated elastomer latex according to claim 1, wherein the alkali metal as A is Li, Na or K.

10. The method for producing a fluorinated elastomer latex according to claim 1, wherein A is $NH_4$.

* * * * *